United States Patent
Dunifon et al.

[19]

[11] Patent Number: 5,927,469

[45] Date of Patent: Jul. 27, 1999

[54] METHOD AND APPARATUS FOR ALIGNING SHEETS OF MATERIAL MOVING ALONG A PATH OF TRAVEL

[76] Inventors: Thomas A. Dunifon, 10965 Neapolis-Waterville Rd., Whitehouse, Ohio 43571; John S. Tomik, 6355 Ave. C - North Shores, LaSalle, Mich. 48145; Brendan M. Buckley, 3927 Grantley Rd., Toledo, Ohio 43613; Hans-Dieter Funk, Schutzenstrasse 16, Witten, Germany, D-58452

[21] Appl. No.: 08/859,679

[22] Filed: May 20, 1997

Related U.S. Application Data

[60] Provisional application No. 60/019,860, Jun. 17, 1996.

[51] Int. Cl.⁶ ................................................. B65G 47/26
[52] U.S. Cl. ................. 198/456; 198/345.1; 198/457.03
[58] Field of Search ............................ 198/345.1, 346.2, 198/456, 457.03, 457.02, 370.01, 370.1, 370.09; 65/104, 273; 271/252, 251, 248

[56] References Cited

U.S. PATENT DOCUMENTS

| | | | |
|---|---|---|---|
| 2,362,079 | 11/1944 | McCann et al. | 198/370.1 |
| 2,986,262 | 5/1961 | Powers | 198/456 |
| 3,621,973 | 11/1971 | Carlson et al. | 198/456 |
| 4,541,520 | 9/1985 | Greenlee, III | 198/457.03 |
| 4,662,925 | 5/1987 | Thimons et al. . | |
| 4,895,244 | 1/1990 | Flaugher et al. . | |
| 4,976,766 | 12/1990 | Kuster et al. | 198/434 |
| 5,305,080 | 4/1994 | Lee et al. | 198/345.1 |
| 5,480,135 | 1/1996 | Nagane et al. | 271/248 |
| 5,577,719 | 11/1996 | Nicoll | 271/250 |
| 5,720,378 | 2/1998 | Fasoli | 198/456 |

*Primary Examiner*—William E. Terrell
*Assistant Examiner*—Khoi H. Tran
*Attorney, Agent, or Firm*—Marshall & Melhorn

[57] ABSTRACT

A method and apparatus for aligning sheets of material moving along a path of travel with respect to a reference line or center line or reference point is shown. A lifter and conveyor will lift a sheet of material traveling in a plane of movement along a path of travel above said plane of movement and move it laterally of said path of travel into contact with an alignment plate, the alignment plate places the sheet of material in a pre-alignment position, the lifter and conveyor lowers, redepositing the sheet of material in the plane of travel, and the alignment plate moves the sheet of material into a final alignment position.

29 Claims, 10 Drawing Sheets

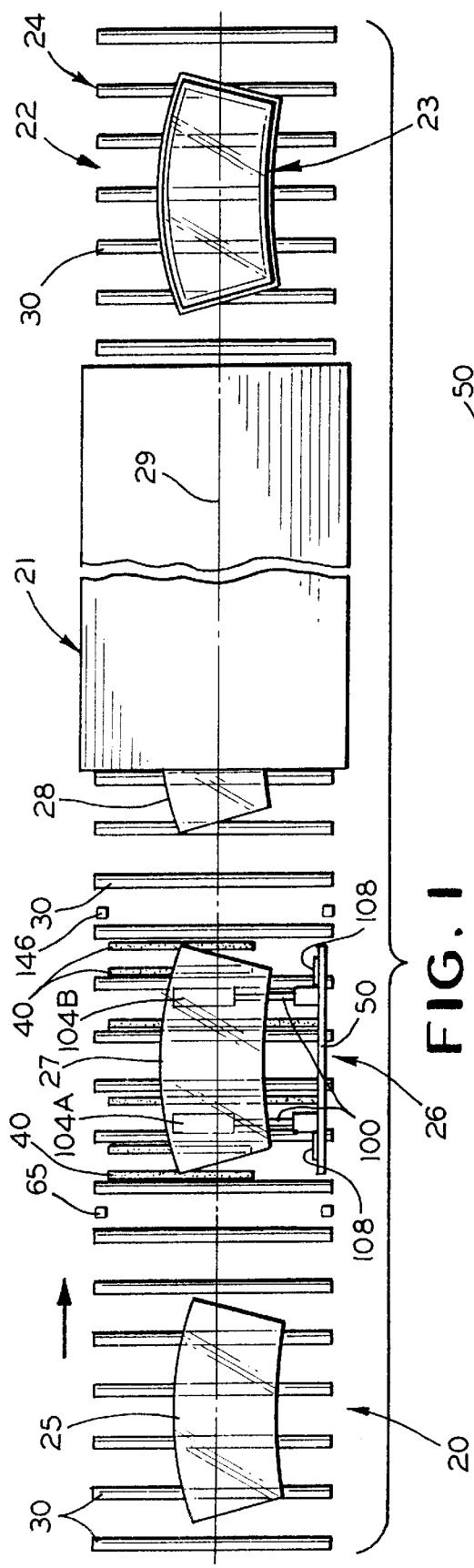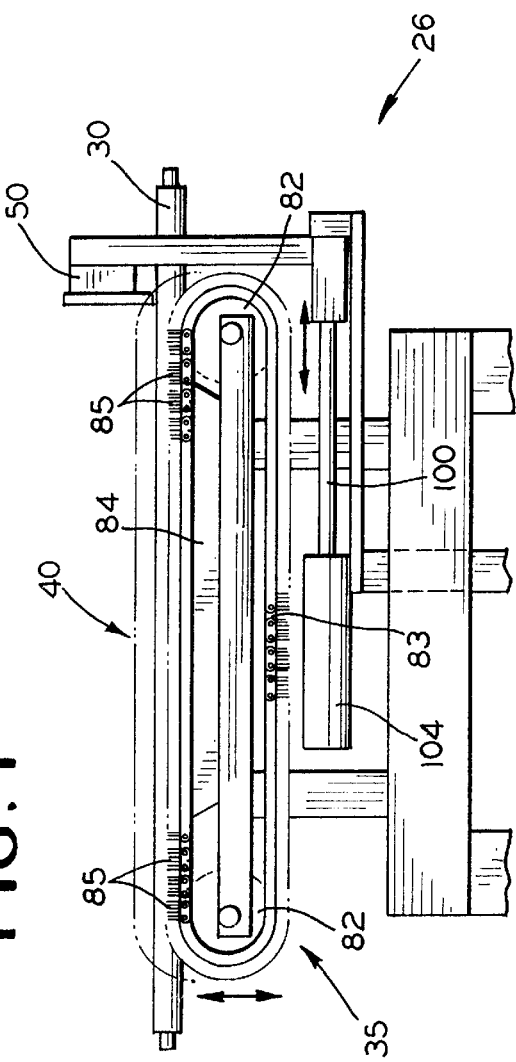

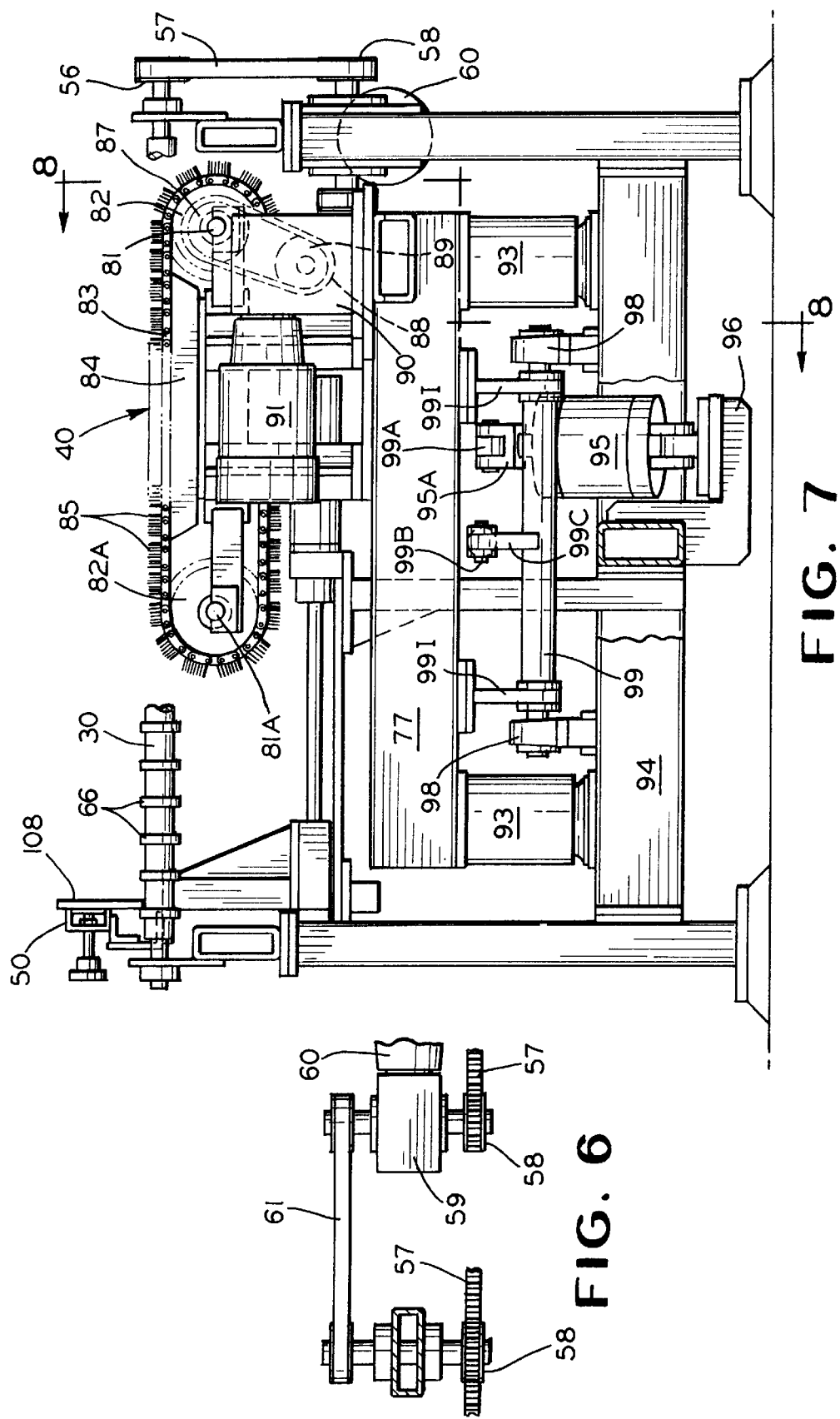

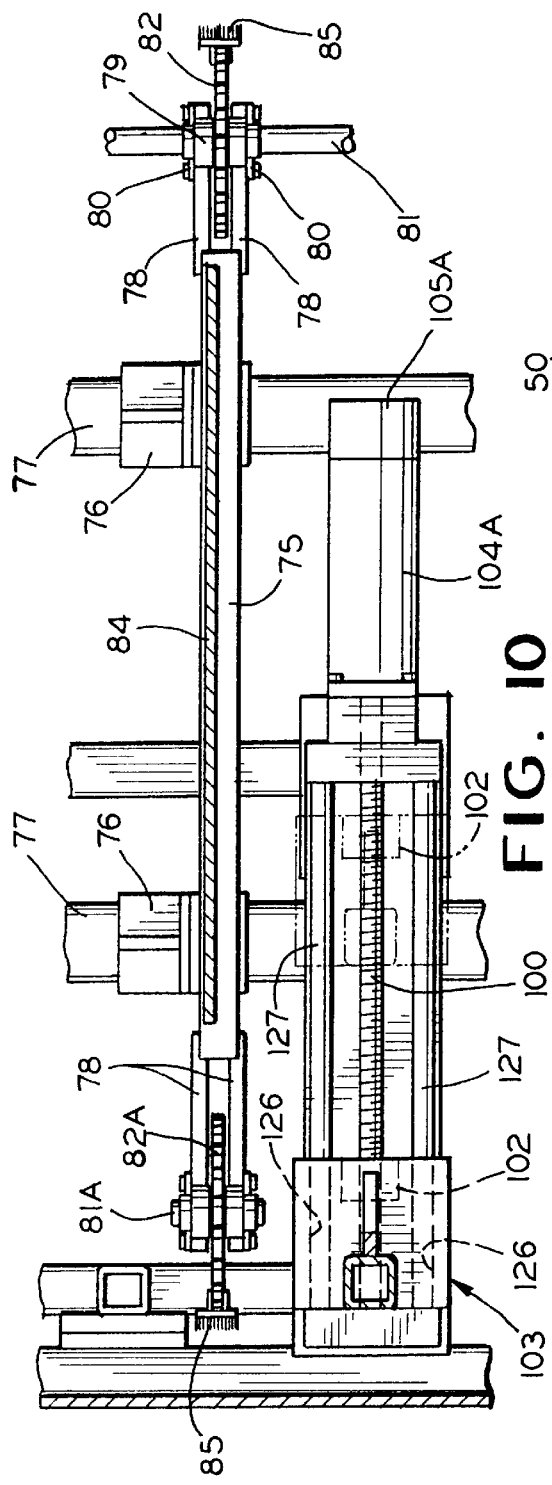

METHOD AND APPARATUS FOR ALIGNING SHEETS OF MATERIAL MOVING ALONG A PATH OF TRAVEL

This application is claiming the benefit, under 35 U.S.C. 119(e) of the provisional application filed on Jun. 17, 1996, under 35 U.S.C. 111(b), which was granted Ser. No. 60/019,860. The provisional application, 60/019,860, is hereby incorporated by reference.

BACKGROUND OF THE INVENTION

1. Field of the Invention

The present invention relates generally to a method and apparatus for aligning sheets of material moving along a path of travel. More particularly, the invention relates to a method and apparatus for aligning sheets of material moving along a production line. Most particularly, the present invention relates to a method and apparatus for aligning glass sheets of generally rectangular or trapezoidal shape moving along a path on a production line with one of their ends or short edges leading.

2. Description of the Prior Art

It is common in producing automotive glass, such as windshields or back lights and the like, to have a piece of glass moving along a production line with its top or bottom edge (with reference to its installed position) perpendicular to the path of travel. A common path of movement is to have an automotive windshield moving along a powered roller conveyor, moving through a heating furnace, and moving to a bending station which bends the heated piece of glass between complemental mold sections to impart a desired curvature to the glass. It has been critical to properly align the glass sheets prior to their entry into the furnace so that they are properly aligned when they come into the bending station.

U.S. Pat. No. 4,895,244 discloses an apparatus for aligning glass sheets moving on a conveyor line prior to shaping on a bending apparatus. These sheets are oriented with their longitudinal axis transverse to the direction of travel, and alignment in a transverse and longitudinal direction is needed. A pair of vertically extending stops engages the leading (wide) edge of the glass sheet in front of the opening to the furnace. A pair of side pushers are actuated in a lateral direction to move into engagement with the opposed ends of the glass sheet to move it into a predetermined position.

While advancing glass sheets with their top or bottom edges as the leading edge was generally satisfactory, as were the means for aligning such sheets on the conveyor, advancing technology in the glass fabricating art has made it desirable to advance items, such as windshields or back lights, with their short or end edge first as the leading edge. One obvious advantage of this is the fact that a narrower and less expensive furnace can be provided. Another advantage is that alignment in only one direction is required.

While conveyors for advancing sheets of materials with their short edge as the leading edge are known, until the present invention there has been no satisfactory method of aligning these sheets with respect to a reference line or point before they enter the glass heating furnace. Thus, those skilled in the art continued to search for a satisfactory way of aligning such sheets.

SUMMARY OF THE INVENTION

A method and apparatus for aligning sheets of material moving along a path of travel with respect to a center line or reference point is provided. A first or powered conveyor means is provided to move a sheet of material along a path of travel with the sheets of material spaced in the direction of travel. When the sheet is in a position of registry with an alignment means, a second, or lifting and conveying, or brush conveyor means will lift the sheet of material off the first conveyor means and move it laterally, or transverse to the direction of travel, into engagement with the alignment means.

In one embodiment of the present invention, a sheet of material is moved along a path by a first conveyor means. A second conveyor means will engage and move the sheet of material laterally of the original path of movement into an alignment means. The alignment means will move the sheet of material into a predetermined desired position with respect to a reference point or center line oriented to the direction of original travel.

In another embodiment of the present invention, a powered conveyor means is used to move glass sheets on a production line along a path of travel as they are conveyed to the entrance of a glass heating furnace. Once a sheet of glass is in a position of registry with an alignment means, a lifting and conveying means lifts the sheet of glass off the powered conveyor means and moves it transversely to the path of travel into engagement with the alignment means. The lifting and conveying means then stops while the alignment means moves the sheet of glass to a pre-alignment position. While the sheet of glass is still on the lifting and conveying means, the alignment means is moved out of engagement with the sheet of material, the lifting and conveying means lowers the sheet of glass back onto the powered conveyor means, and the alignment means moves the sheet of glass into a final alignment position.

In yet another embodiment of the present invention, a powered roller conveyor means will move a sheet of glass toward a glass heating furnace until the sheet passes a sensor means. The sensor means causes the powered roller conveyor to stop or decelerate to a stop in a manner well known in the art to place the sheet of glass in a position of registry with an alignment means positioned in a plane in which the glass is to be aligned. Substantially simultaneously with the deceleration or stopping of the powered roller conveyor, a brush conveyor having one or more runs parallel and interspersed with the powered rollers begins operation. The brush conveyors are elevated to, through and above the plane of movement of the glass sheet to lift the glass sheet off the powered rollers and move it laterally into engagement with an alignment means or pusher plate; the brush conveyor then stops while the pusher plate moves the sheet of glass into a pre-alignment position; the pusher plate retracts, the brush conveyor lowers beneath the plane of movement of the glass sheet, redepositing the glass sheet on the powered rollers in the plane of movement; the pusher plate again engages the glass sheet and moves it laterally into a final alignment position; the pusher plate retracts, and the sheet of glass is free to move, in the aligned position, along the path of travel once again.

In any embodiment of the invention, it is desirable that the pusher plate have each end thereof adjustable separately. This makes it possible to slightly "skew" a sheet of material in the aligner, if necessary, to compensate for variables in the path of travel, such as conveyor roller wear, etc.

Therefore, it is an object of the present invention to provide a method and apparatus for properly aligning sheets of material traveling along a path of movement with respect to a reference point.

It is a further object of the present invention to provide a method and apparatus for properly aligning sheets of material, of other than square shape, traveling along a path of movement with a short edge being the leading edge, with respect to a reference point or line.

It is another object of the present invention to provide a method and apparatus for aligning sheets of glass moving on a production line with their short or leading edge first with respect to a center line or reference point.

Further objects and advantages of this description will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a top plan view of a portion of a production line including an alignment apparatus embodying the construction of the present invention;

FIG. 2 is a diagrammatic view showing the brush conveyor and the alignment mechanism in accordance with the present invention;

FIG. 6 is a sectional view, taken in the direction of the arrows, along the section line 6—6 of FIG. 5;

FIG. 7 is a sectional view, taken in the direction of the arrows, along the section line 7—7 of FIG. 5;

FIG. 10 is a sectional view, taken in the direction of the arrows, along the section line 10—10 of FIG. 9;

FIG. 11 is a sectional view, taken in the direction of the arrows, along the section line 11—11 of FIG. 8;

FIG. 12 is a sectional view, taken in the direction of the arrows, along the section line 12—12 of FIG. 8;

Figure 3:
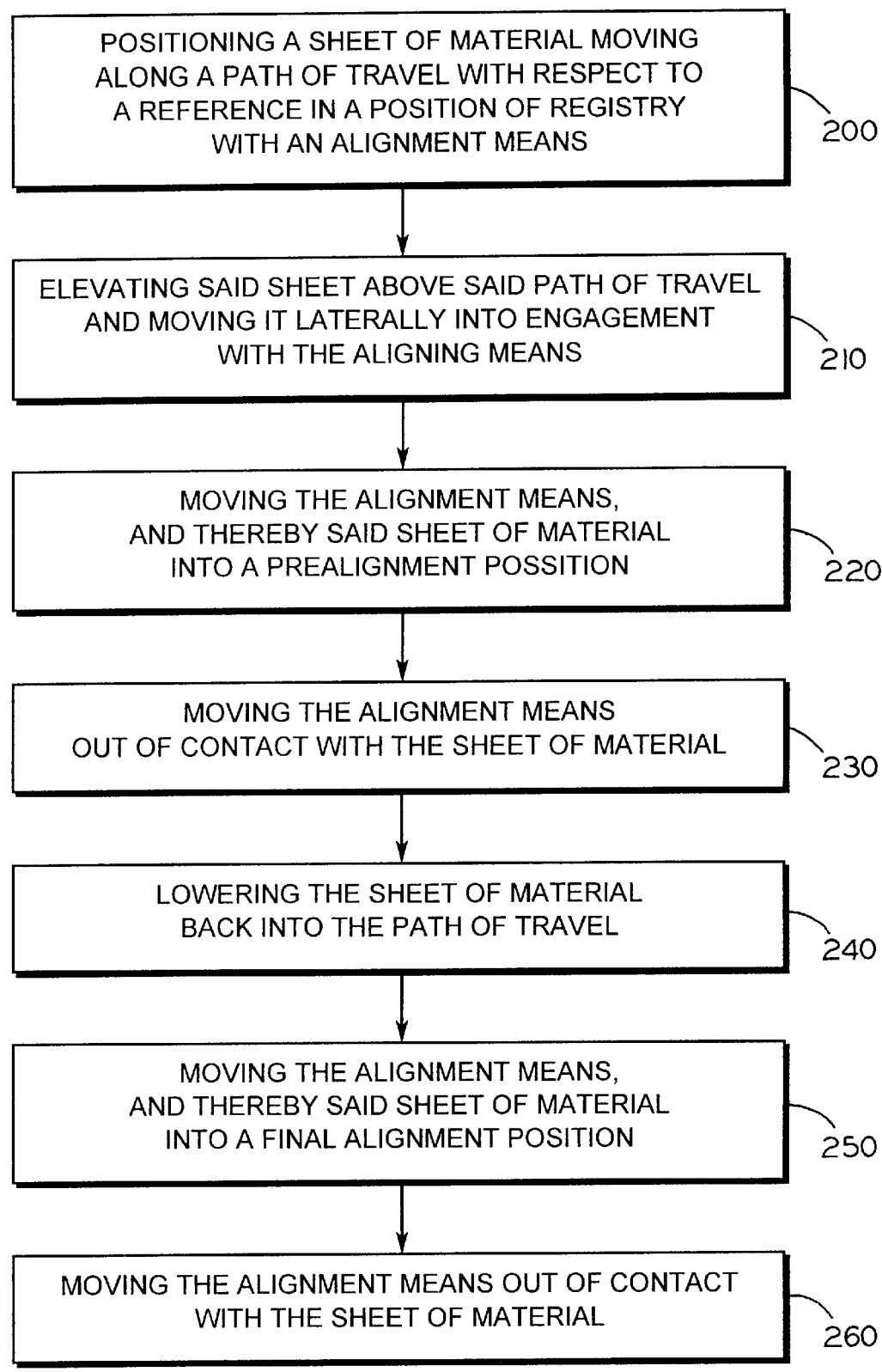
FIG. 3 is a flow chart showing a series of steps which may be used in practicing the method of the present invention.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology used herein is for the purpose of description, and not of limitation.

DESCRIPTION OF THE PREFERRED EMBODIMENT

Referring now to FIG. 1, there is shown a portion of a windshield manufacturing installation including a supply or first conveyor means 20 which delivers glass sheets to the entrance of a furnace 21 for heating the glass sheets to bending temperatures. Although in the preferred embodiment, the glass sheets are shown traveling along the conveyor means with one of their short edges leading, it can be understood from the foregoing that the present invention is not limited to such orientation.

As the sheets leave the heating furnace 21, they enter a bending station 22 where they are shaped to the desired curvature by suitable bending apparatus; 23 and transported by a further conveyor 24 to a cooling station (not shown).

As further shown in FIG. 1, a glass sheet 25 has been transported by the first or supply or powered conveyor means 20 to the entrance of an alignment apparatus 26, while another sheet 27 is in a position of registry in the alignment apparatus 26, and a further sheet 28 is entering the furnace 21. The alignment apparatus 26 positions the glass sheets such that they enter the bending station 22 in the proper orientation, and they exit the furnace 21 in the same orientation. Accurate alignment of the sheets relative to the bending apparatus 23 is necessary for proper shaping.

It is desired to align the glass sheets with respect to a reference point or reference line or center line 29 as they travel down the conveyor means 20 on their way to the furnace 21. The conveyor means 20 can include a plurality of rollers 30 which are aligned in a generally horizontal plane leading to an entrance opening in the furnace.

Referring to FIG. 2, a diagrammatic representation of the alignment apparatus 26 is shown. The alignment apparatus or means 26 includes a second conveyor or lifting and conveying means 35 which reciprocates in a vertical path from a position below the plane of movement of the glass sheets, as defined by the top of the conveyor rollers 30, to and through the plane of movement to a position above the conveyor rollers 30. Each run 40 of the lifting and conveying or brush conveyor 35 includes a conveyor chain 83 mounted for movement on a pair of sprockets 82 driven by suitable driving means. The conveyor chain 83 is formed by a suitable number of chain links well known in the art, which are supported by guide rail 84. Bristles or brushes 85 are mounted to the chain links for purposes described hereinafter. Each run 40 of the conveyor means 35 is powered and reciprocated in a manner more fully described below, and operates in a direction laterally or transverse to the direction of movement of the glass sheets along the production line.

It can be understood by one skilled in the art that when the conveyor run 40 vertically reciprocates or lifts from a position below the plane of movement of the glass sheets along the conveyor rollers 30 (shown in solid lines) to a position above the plane of movement of the conveyor rollers 30 (shown in dotted lines) the conveyor means 35 is capable of lifting, engaging and laterally moving a glass sheet into engagement with alignment means 26. The alignment means has a pusher plate 50 which reciprocates in a horizontal plane, at least a portion of which is in the plane of movement of the glass sheets along the conveyor rollers 30. Alignment motor 104 rotates drive shaft 100 to cause the plate 50 to advance or retract, depending on the direction of rotation of the shaft 100.

Referring to FIG. 3 the method of the present invention, in its broadest form, may include the steps of positioning a sheet of material moving along a path of travel with respect to a reference point or center line in a position of registry with an alignment means (box 200); next the sheet is elevated above said path of travel and moved laterally into an engagement with an aligning means (box 210); the alignment means, and thereby said sheet of material, is next moved into a prealignment position (box 220); the alignment means is slightly backed off from the sheet of material (box 230); the sheet of material is lowered back in to the path of travel (box 240); the alignment means is again moved into contact with the sheet of material, and the sheet of material is moved into a final alignment position (box 250); the alignment means is moved out of contact with the sheet of material, and the aligned sheet is free to move along the path of movement on the conveyor.

Figure 4:
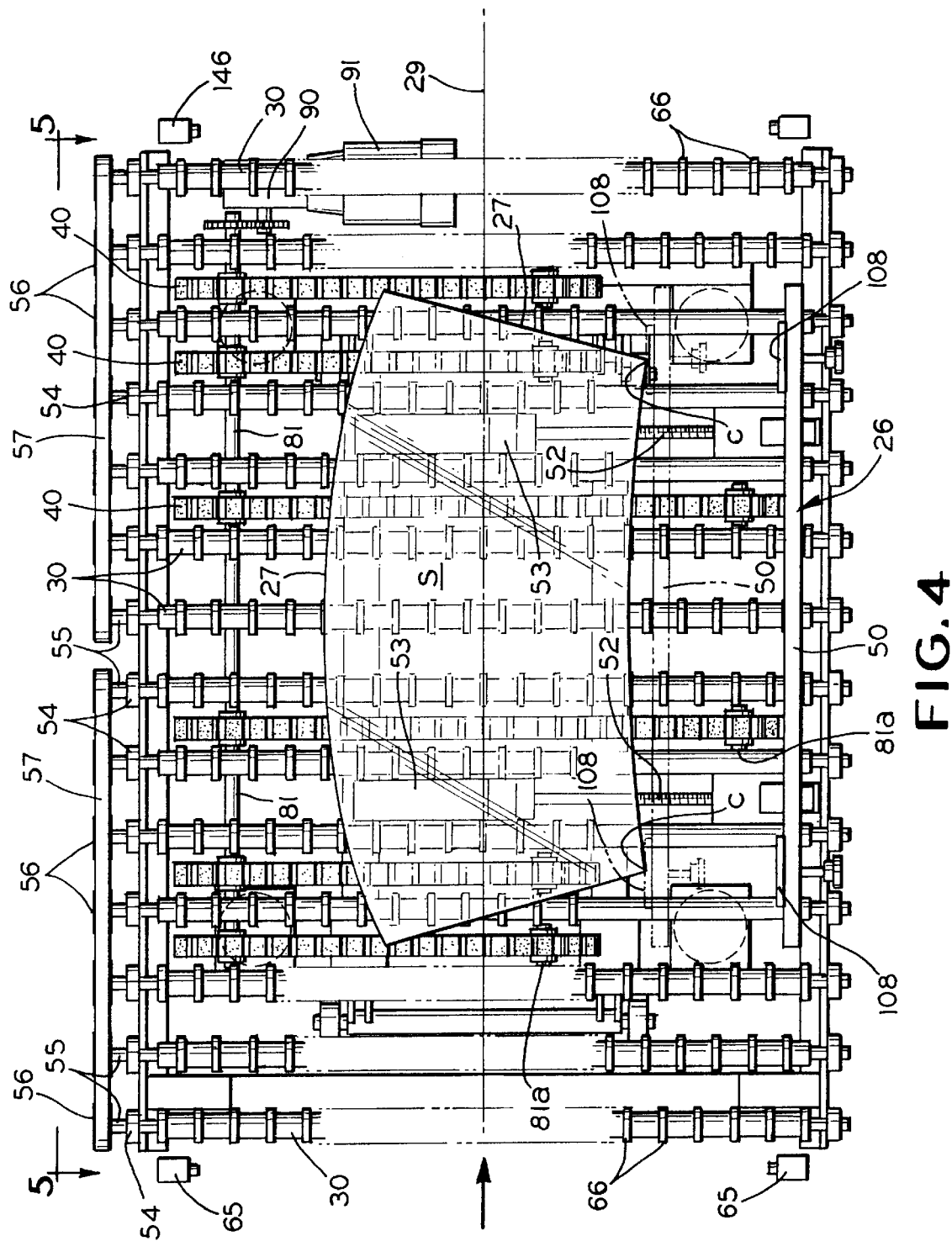
FIG. 4 is plan view of an alignment mechanism embodying the construction of the present invention showing a windshield traveling along a path of travel with its short or end or leading.
Figure 5:
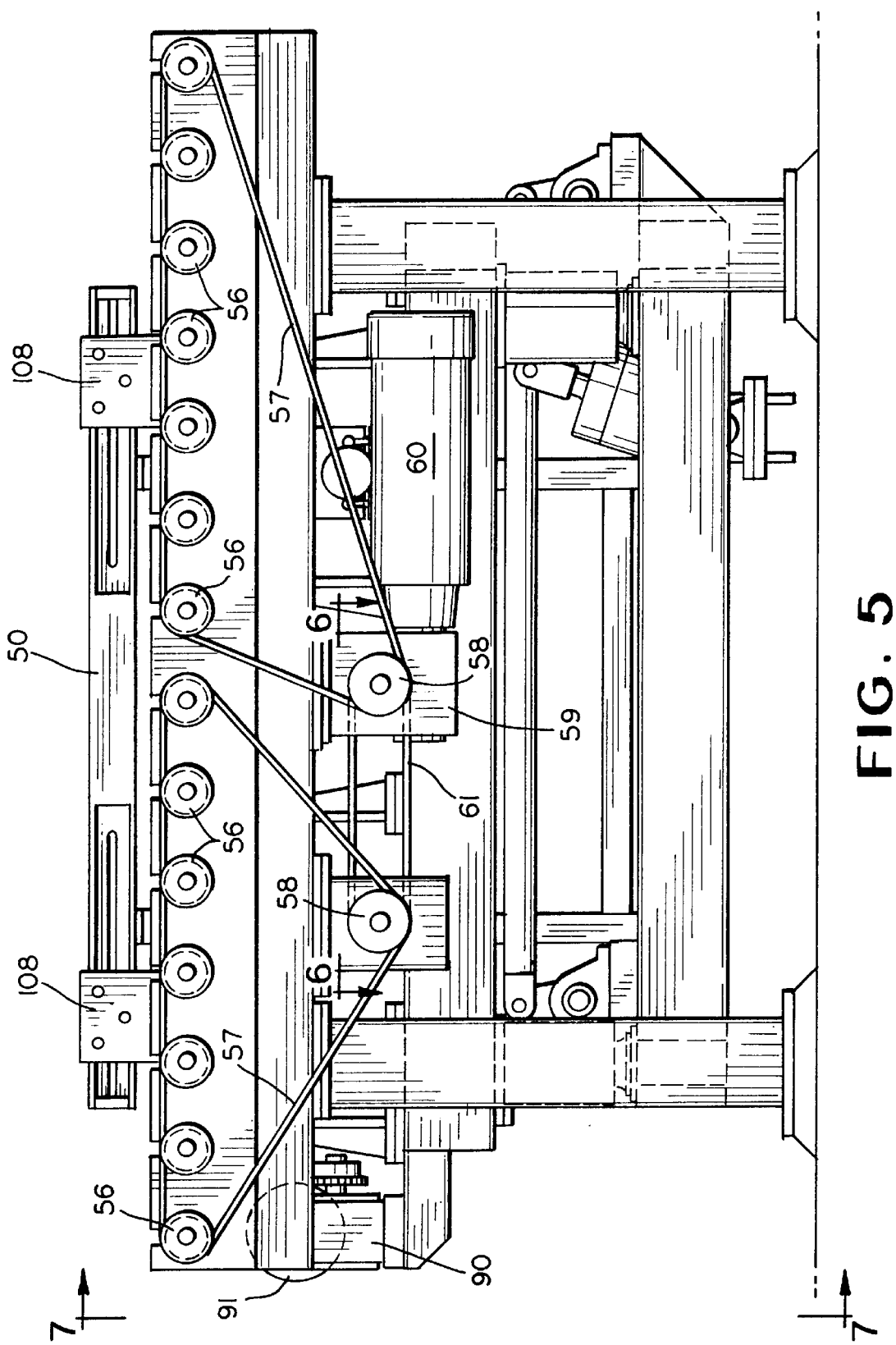
FIG. 5 is a sectional view, taken in the direction of the arrows, along the section line 5—5 of FIG. 4.

Referring to FIGS. 4–6, the operation of the conveyor rollers 30, and the alignment means 26, is illustrated in more detail. Each of the conveyor rollers 30 is mounted for rotation in suitable bearings 54. Extending past the bearings 54 are stub shafts 55 to which are mounted pulleys 56. Each of a group of pulleys may be connected by a belt 57 to a drive pulley 58 driven by a gear box 59. A source of power 60, such as an electric or hydraulic motor, drives the gear box 59. Connecting belt 61 connects the second set of pulleys to the gear box 59. Although the conveyor rollers 30 are shown being driven in two separate groups, the means of powering conveyor rollers 30 is well known in the art, and any conventional drive means may be used.

As shown by the arrow in FIG. 4, the glass sheet 27 is traveling in a horizontal plane of movement, with one of its short or end edges first, in a direction from the left side of the sheet to the right. In doing so, it has passed a pair of glass-in sensors 65, which have operated to stop the glass sheet 27 in a position of registry with the alignment means 26. The conveyor rollers 30 will have anti-marring collars 66 to prevent marring the windshields as they move along the path of travel. In order that the glass pusher plate 50, and more particularly the blocks 108 to be described, may move laterally in a plane in which the glass sheets are to be aligned, the anti-marring collar 66 will be absent from a portion of at least some of the conveyor rollers 30.

Referring to FIGS. 4,7,8 and 9 the operation of the lifting and conveying means or brush conveyor 35 may be understood. As shown in FIG. 4, each run 40 of the brush conveyor 35 is interspersed between a pair of conveyor rollers 30 in the alignment means 26. There may be a conveyor run 40 spaced between every conveyor roller 30 or, as illustrated in FIG. 4, between fewer than all of the conveyor rollers 30. Also, the conveyor runs 40 may extend substantially for the entire width of the alignment means 26, or as shown, some of the conveyor runs 40 may extend for less than the entire length and be spaced off center with regard to the alignment apparatus. The exact spacing, positioning, and number of conveyor runs 40 will depend upon the application.

Each conveyor run 40 will include a cross bar 75 fastened to a pair of pedestals 76. The pedestals 76 are mounted in alignment to a reciprocating frame or base 77. At each end of the cross bar 75 is mounted a pair of bearing blocks 78. The bearing blocks 78 each provide for mounting a bearing 79. The bearing 79 is held in place by use of bearing retainer 80. Mounted for rotation in the bearings 79 at one end of each conveyor run 40 is shaft 81 which will connect and drive all of the conveyors in a manner to be described below. Due to the fact that some of the conveyor runs 40 are of a different length, a common shaft, such as shaft 81, can't be used at the other end of the runs 40. Therefore, short, individual shafts 81A are used at the other end of each run.

Fixedly mounted to each shaft 81 between the bearing blocks 78 is a suitable sprocket 82. Mounted to each individual shaft 81A is a free wheeling sprocket 82A. Extending between the pair of sprockets (82,82A) is a suitable roller chain 83 supported on chain guide 84. Mounted to each link of the chain 83 is a brush 85.

Figure 8:
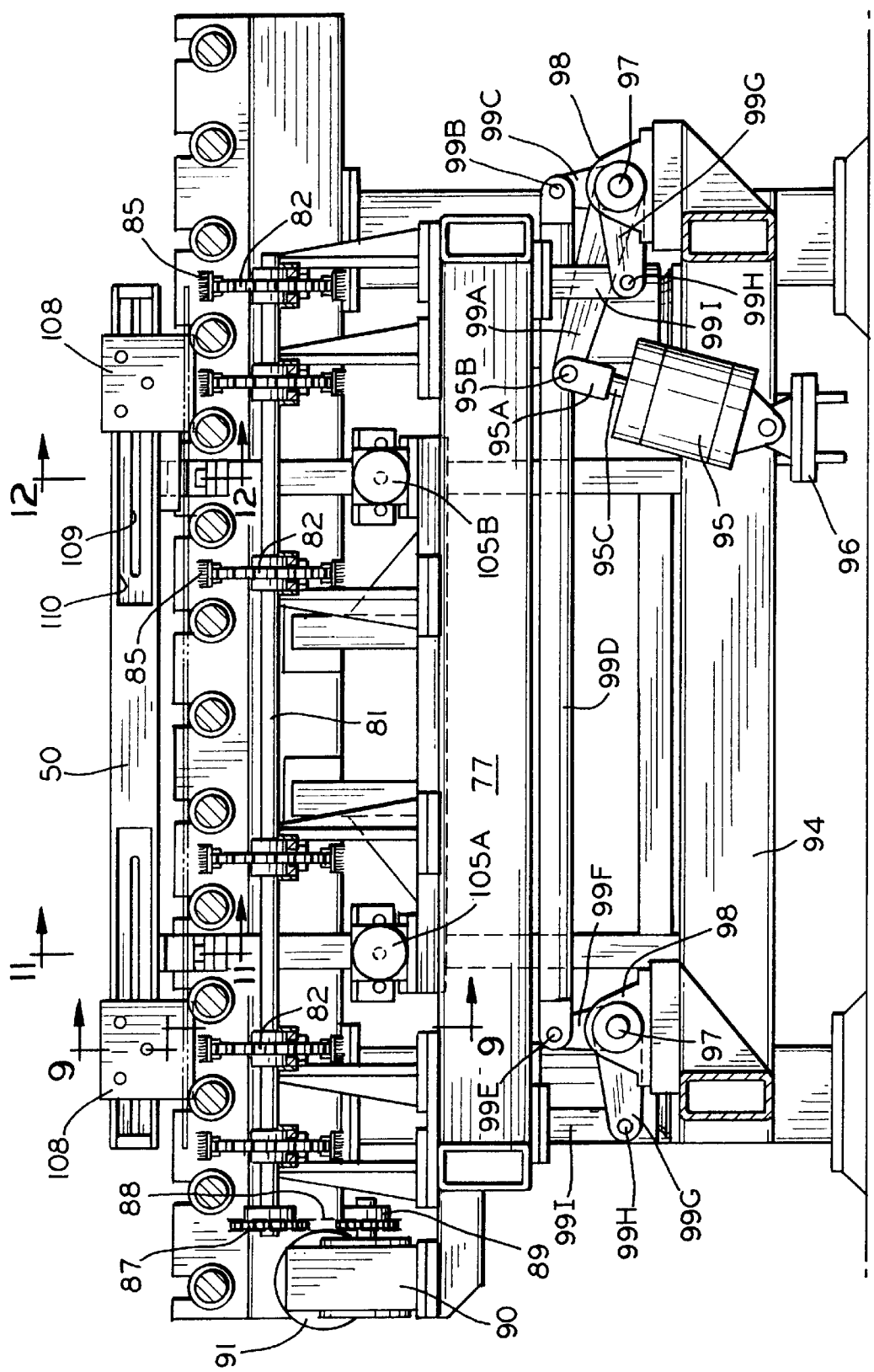
FIG. 8 is a sectional view, taken in the direction of the arrows, along the section line 8—8 of FIG. 7.
Figure 9:
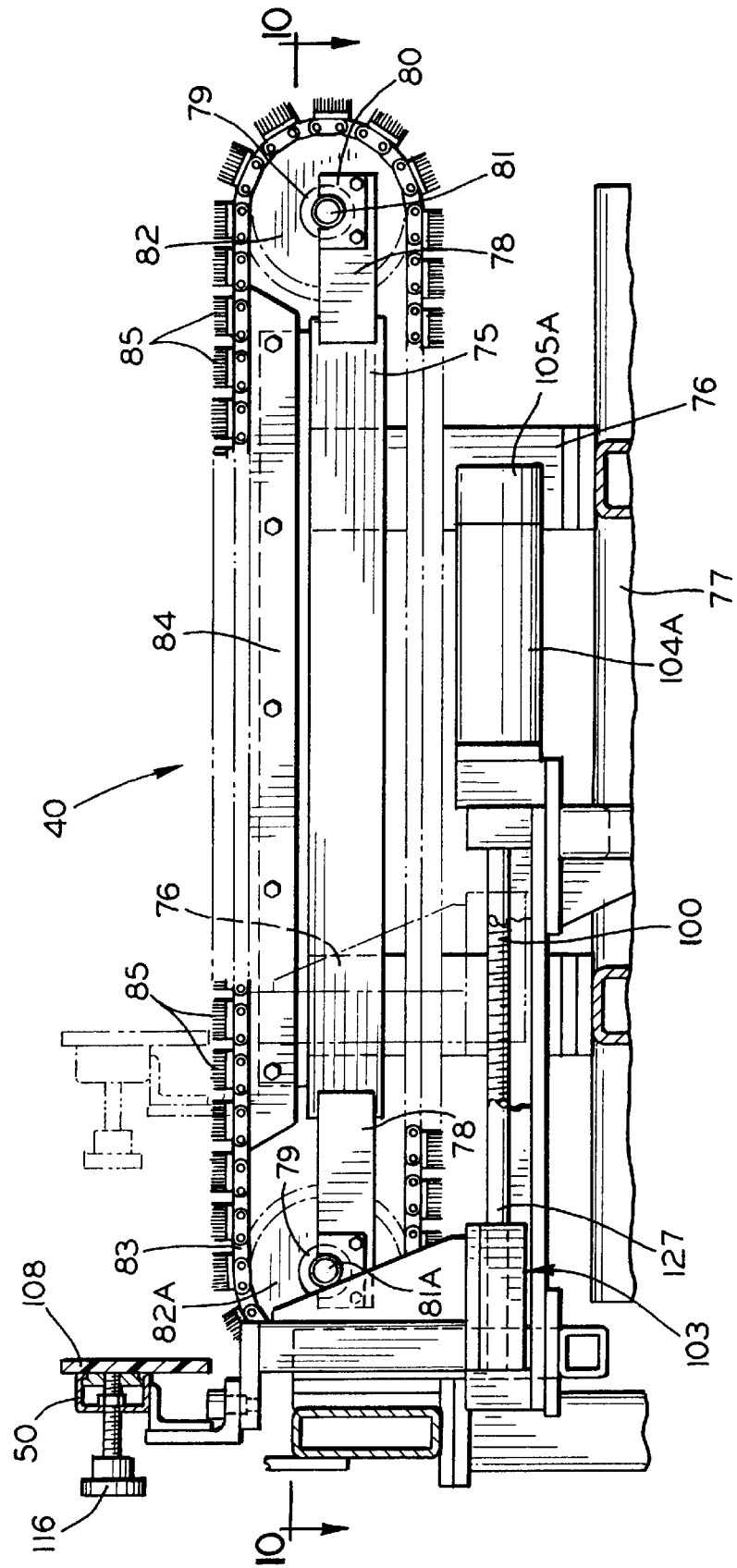
FIG. 9 is a sectional view, taken in the direction of the arrows, along the section line 9—9 of FIG. 8.

As shown in FIGS. 7 and 8, the shaft 81 connects all of the drive sprockets 82 together. At one end of the shaft 81 is mounted a first, or driven, sprocket 87. The driven sprocket 87 is connected by drive chain 88 to second, or drive sprocket 89. Drive sprocket 89 is mounted to a right angle gear box 90, which is driven by brush motor 91. The brush motor 91 is connected to a control system to be described hereinafter.

In order to reciprocate the base 77 to which the pedestal 76 and the right angle gear box 90 are mounted a fluid cylinder 95 is provided which is mounted to cylinder support 96. The cylinder 95 is connected to a source of pressurized fluid (not shown). In order to transfer power from the cylinder 95 to the base 77, a pair of shaft and torque tube arrangements are used. A pair of shafts 97 are mounted in a parallel spaced relationship, one on each side of the lower frame member 94, in bearing blocks 98. A pair of torque tubes 99 are mounted for rotation on the shafts 97. One of the torque tubes 99 is rotated by a female clevis linkage 95A, rotatably connected by pin 95B, to torque tube input link 99A. Female clevis 95A is mounted for reciprocation to shaft 95C of fluid cylinder 95.

Connecting the torque tubes 99 is cross-over shaft 99D, connected by pins (99B,99E) to torque tube output link 99C and second input link 99F. It can be understood that when the shaft 95C is extended by the fluid cylinder 95, the torque tubes 99 rotate an equal amount, provided the dimensions of the input and output links are chosen properly. Each torque tube 99 has a pair of identical output links 99G connected by pins 99H to base links 99I. Since the torque tubes 99 rotate equal amounts, both sides of the frame 77 will be raised and lowered evenly by operation of the cylinder 95. A plurality of actuators 93 cushion the movement of the base 77.

Referring to FIGS. 4 and 10–12, the operation of the alignment means 26 will now be described in detail. A glass pusher plate 50 is shown in its home position in solid lines in FIG. 4. The pusher plate 50 is shown in its pre-alignment position in phantom lines in the same figure, about to contact the corners C of a sheet of glass S. While normally the glass pusher plate 50 is parallel to the path of travel, and thus to the reference point or center line 29, it is preferable that the glass pusher plate 50 be able to have each of its ends adjusted individually so that the glass sheet may be slightly "skewed" if necessary to make up for variables in the conveyor operation, due to conveyor roller wear, etc.

To accomplish this, each end of the glass pusher plate 50 is driven by a threaded drive shaft 100 which rotates within a bearing block 102 mounted within slide block assembly 103. Each slide block assembly 103 includes a pair of grooves 126 which ride on a pair of rails 127.

Drive shaft 100 is driven by first alignment motor 104A, to which is connected first encoder 105A, which constantly monitors the position of the drive shaft 100. Since each of the first and second alignment motors (104A,104B) and first and second encoders (105A,105B) is connected to the control system hereinafter described, and each is individually controllable, the glass pusher plate 50 may be positioned parallel to the path of travel, or slightly skewed, as desired.

In order to prevent damage to the glass sheet S, and reduce wear on the glass pusher plate 50, it is desirable that the pusher plate 50 not contact the glass directly. Instead, nylon blocks 108 are provided which actually contact the corners C of the glass sheet S. Other materials may be used depending upon the application. It is also desirable to have the nylon blocks 108 adjustable to accommodate different lengths of sheets S which may be moving down the production line. To accomplish this a pair of slots, namely a narrow slot 109, and a wide slot 110, are provided in the glass pusher plate 50.

The nylon blocks 108 are fastened to a T-shaped mounting block 111 by fastening means 112, such as the screws illustrated. Without more, the combination of the nylon block 108, T-shaped mounting block 111 and fastening means 112 would be free to move up and down the length of the wide slot 110. To prevent this from happening, a recess 113 is provided in the mounting block 110. The recess 113 receives the end of a screw 114 which has been placed through the narrow slot 109. The mounting block 111 is retained in the slot 110 by the combination of the screw 114 cooperating with the recess 113 and the nut 115. A knob 116 is provided on the other end of the screw 114 for convenience in operation. Both ends of the pusher plate 50 will have this arrangement to provide for adjustability of the nylon blocks 108.

To provide for operation when the pusher plate 50 is not to be parallel with the reference line 29, it is necessary to provide special mounting at the ends of the pusher bar 50. Referring to FIG. 11, one end of the pusher bar 50 may be mounted to angle 118. The angle 118 is, in turn, fixedly mounted to mounting angle 119, which is rotatably mounted to the slide block assembly 103 by means of the bushing 120 cooperating with the thrust washer 121 and the mounting bolt 122.

Since moving the end of the mounting plate 50 in one direction more than the other would tend to twist and damage the pusher plate 50, special provisions need to be made so that the pusher plate can slide with respect to one end of the mounting angle 119. As shown in FIG. 12, in the preferred embodiment this is accomplished by using a rail and channel system on one end of the pusher plate 50. Instead of mounting the pusher plate 50 to the angle 118 it is mounted to a runner block 123. To runner block 123 is mounted a portion of rail 124. The rail 124 slides in the recess 125A of a substantially C-shaped channel 125.

If it is necessary to adjust the pusher plate 50 in a position other than parallel with the line of travel, the drive shaft 100 of either of the alignment motors (104A,104B) will turn a greater number of revolutions than the other drive shaft. This will cause the mounting angles 119 to rotate about the bushings 120, and will cause the runner block 123 and rail 124 to travel a short distance in the channel 125. A satisfactory rail and channel system for achieving this may be such as the "Nook" star ball rail system. A satisfactory drive for the pusher plate 50 may be such as the Thomson dual shaft rail system.

Figure 13:
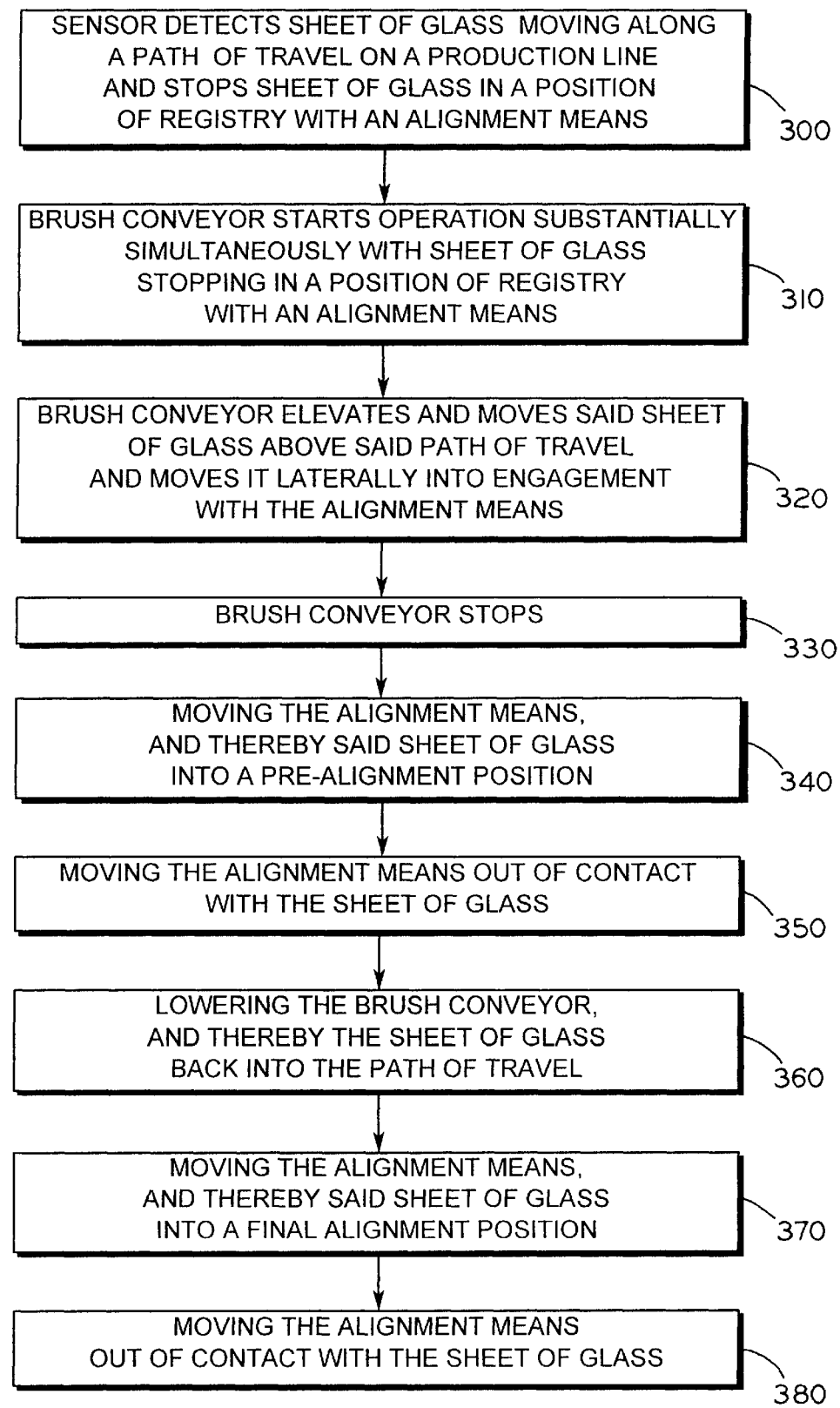
FIG. 13 is a flow chart showing a series of steps used in one embodiment of the method of the present invention.
Figure 14:
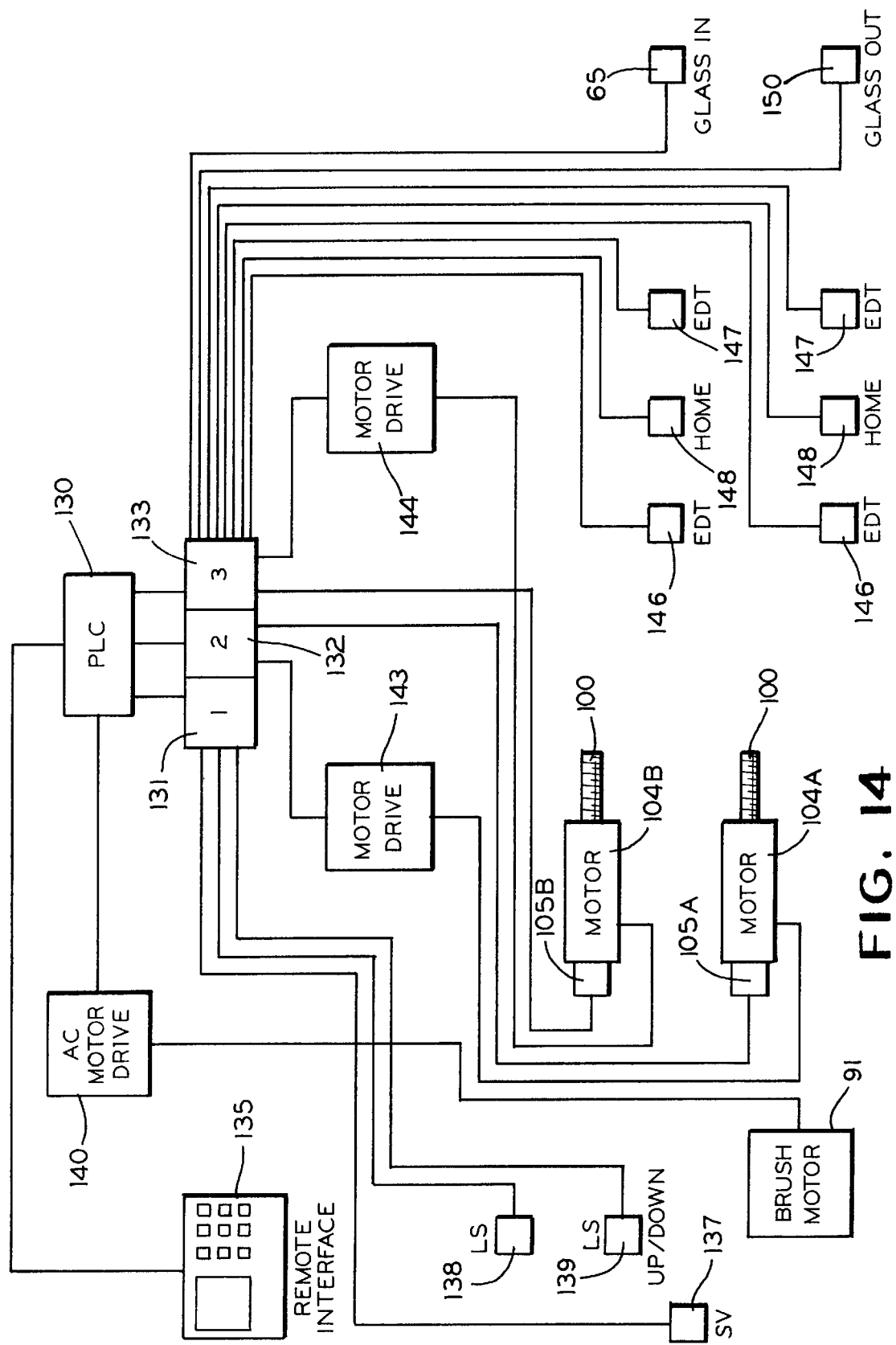
FIG. 14 is a schematic view showing a control system in accordance with the present invention.

Referring now to FIGS. 13 and 14, the overall operation of the system is described. The overall system is under the operation of a programmable logic controller (PLC) 130. The PLC 130 is connected to a first motion controller 131 a second motion controller 132 and a third motion controller 133. The operator, in preparation for operation of the system will have programmed the remote interface 135 with values needed for operation of the system, such as the size of the sheet of glass being aligned by the system, the speed of the powered roller conveyor, and/or brush conveyor, the thickness of the sheet of glass, etc.

In one embodiment of the invention, the system may operate according to the method of FIG. 13. A sensor will detect a sheet of glass moving along a path of travel on a production line with one of its short or end edges first. A signal from the sensor will cause the system to stop the sheet of glass in a position of registry with an alignment means (box 300). The brush conveyor will start operation substantially simultaneously with the sheet of glass stopping in the position of registry with the alignment means (box 310). Next, with the brush conveyor operating, the brush conveyor elevates to contact said sheet, move said sheet above said path of travel, and move it laterally into alignment into engagement with an alignment means (box 320).

Next, the brush conveyor stops (box 330) and the alignment means moves into a prealignment position, thereby moving said sheet of glass into a prealignment position (box 340).

To avoid damage to the alignment means 26, it is moved out of contact with the sheet of glass (box 350), and the brush conveyor is lowered, thereby lowering the sheet of glass back into the path of travel on the powered roller conveyor means (box 360). The alignment means next moves the sheet of glass into a final alignment position (box 370), after which it moves out of contact with the sheet of glass (box 380), so that the sheet of glass may move on its way on the powered roller conveyor without damaging the alignment means.

To accomplish the steps shown in FIG. 13, a sheet of glass moving along the path of travel on the conveyor rollers 30 will pass a glass-in sensor 65, which will operate means well known in the art (not shown) to cause the sheet of glass S to stop in registry with the glass pusher plate 50. Once this happens, a signal will be sent by the PLC 130 to start operation of the brush conveyor 35. A signal will be sent to the solenoid valve 137 which will supply a pressurized fluid from a source of fluid (not shown) to the fluid cylinder 95 which will operate the clevis linkage (previously described) to elevate the brush conveyor. The range of travel or elevation is between limits established by the limit switches 138 and 139.

The brush motor 91 is operated by the PLC 130 through the A.C. motor drive 140. A sheet of glass S will be carried by the brush conveyor 35 into engagement with the glass pusher plate 50, at which time the PLC 130 will send a signal to the A.C. motor drive 140 to stop the operation of the brush motor 91. At this time, the PLC 130 will send a signal, based on the values programmed into the remote interface 130 by the system operator, to the first alignment motor drive 143 and the second alignment motor drive 144, which are connected to the first alignment motor 104A, and the second alignment motor, 104B, respectively. The position of the shafts 100 driven by the motors (104A,104B) is tracked by the encoders (105A,105B), which send a signal back to the respective second and third motion controllers 132 and 133. It can be understood that if the operator has programmed in different values to the PLC 130 through the remote interface 135, the shafts 100 may be positioned to different relative positions by the motors (104A,104B), and therefore slightly "skew" the glass as necessary. For safety purposes, each motor (104A,104B) and associated shaft 100, has a series of limit switches associated therewith. These are the first end of travel limit switch 146, the second or opposite end of travel limit switch 147, and the home position limit switch 148.

After the motors (104A,105B) have operated to move the glass to a prealignment position, a signal is sent to reverse the motors (104A,104B) and thereby retract the glass pusher plate 50 a slight amount to remove it from engagement with the sheet of glass S. Also, a signal is sent to the solenoid valve 137 to cause the fluid cylinder 95 to retract and move the brush conveyor 35 down below the path of travel, thereby redepositing the sheet of glass on the conveyor rollers 30.

At this time, the second and third motion controllers (132,133) will send signals to first and second motor drives (143,144) to cause the motors (104A,104B) to again rotate the shafts 100 to move the sheet of glass S to a final alignment position according to the values programmed into the PLC 130 by the remote interface 135. Once the sheet of material is in its final alignment position, the motors (104A, 105B) again reverse, withdrawing the glass pusher plate 50 to its home position, and allowing the now aligned sheet of glass S to continue along its path of travel to the glass heating furnace 21, and ultimately to the bending station 22. The sheet of glass S, when leaving the alignment means 26, will pass the glass out sensor 150, which will supply a signal to third motion controller 133 that the aligner 26 is ready to receive another sheet of glass.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of aligning sheets of material moving along a path of travel with respect to a reference point, said method including the steps of:
   a) providing a first conveyor means for moving said sheets of material along said path of travel,
   b) providing an alignment means for aligning said sheets of material with respect to said reference point,
   c) providing a second conveyor means positioned below said path of travel of said sheets on said first conveyor means, and selectively operable to rise above the path of travel and engage and lift said sheets off of said first conveyor means and move said sheets generally laterally of said path of travel into engagement with said alignment means,
   d) operating said first conveyor means until at least one of said sheets of material is in a position of registry with said alignment means,
   e) operating said second conveyor means to lift said sheet off of said first conveyor means and move it laterally into engagement with said alignment means,
   f) stopping said second conveyor means when said sheet engages said alignment means,
   g) moving said alignment means, and thereby said sheet of material, into a pre-alignment position while the sheet is still on said second conveyor means,
   h) moving said alignment means out of engagement with said sheet of material,
   i) lowering said second conveyor means below said path of travel thereby redepositing said sheet on said first conveyor means,
   j) moving said alignment means into reengagement with said sheet to place the latter into a final alignment position, and
   k) again moving said alignment means out of engagement with said sheet, freeing said sheet to resume movement along said path of travel.

2. A method of aligning sheets of material moving along a path of travel with respect to a reference point, said method including the steps of:
   a) operating a first conveyor means until at least one of said sheets of material is in a position of registry with an alignment means for aligning a sheet of material with respect to a reference line positioned in said path of travel, and stopping said first conveyor means,
   b) operating a second conveyor means to lift said sheet of material off of said first conveyor means and move it laterally into engagement with said alignment means,
   c) stopping said second conveyor means when said sheet engages said alignment means,
   d) moving said alignment means, and thereby said sheet of material, into a pre-alignment position while said sheet is still on said second conveyor means,
   e) moving said alignment means out of engagement with said sheet,
   f) lowering said second conveyor means below said path of travel, thereby redepositing said sheet of material on said first conveyor means,
   g) moving said alignment means into reengagement with said sheet to place said sheet into a final alignment position, and
   h) again moving the alignment means out of engagement with said sheet, freeing said sheet to resume movement along said path of travel.

3. A method of aligning sheets of glass moving along a path of travel with respect to a reference point, said method including the steps of:
   a) operating a first conveyor means until at least one of said sheets of glass is in a position of registry with an alignment means for positioning a sheet of glass with respect to a reference line located in said path of travel, and stopping said first conveyor means,
   b) operating a lifting and conveying means to lift said glass sheet off of said first conveyor means and move it laterally into engagement with said alignment means,
   c) stopping said lifting and conveying means when said glass sheet engages said alignment means,
   d) moving said alignment means, and thereby said sheet of glass, into a pre-alignment position while the glass sheet is still on said lifting and conveying means,
   e) moving said alignment means out of engagement with said glass sheet,
   f) lowering said lifting and conveying means below said path of travel, thereby redepositing said sheet of glass on said first conveyor means,
   g) moving said alignment means into reengagement with said sheet of glass to place said sheet of glass into a final alignment position, and
   h) again moving said alignment means out of engagement with said sheet, freeing said sheet to resume movement along said path of travel.

4. A method of aligning sheets of glass moving along a path of travel with respect to a reference point, said method including the steps of:
   a) operating a powered roller conveyor means until at least one of said sheets of glass is in a position of registry with an alignment means having a glass pusher plate positioned in a plane in which said glass sheets are to be aligned, and stopping said powered roller conveyor means,
   b) operating a brush conveyor means to lift said sheet of glass off of said powered roller conveyor means and move it laterally into engagement with said glass pusher plate,
   c) stopping said brush conveyor means when said sheet of glass engages said glass pusher plate,
   d) moving said glass pusher plate, and thereby said sheet of glass, into a pre-alignment position while the sheet is still on said brush conveyor means, e) moving said glass pusher plate out of engagement with said sheet of glass, f) lowering said brush conveyor means below said path of travel, thereby redepositing said sheet of glass on said powered roller conveyor means, g) moving said glass pusher plate into reengagement with said sheet of glass to move said sheet into a final alignment position, and h) again moving said glass pusher plate out of engagement with said sheet of glass, permitting said sheet of glass to resume movement along said path of travel.

5. An apparatus for aligning sheets of material moving along a path of travel with respect to a reference point, including:

a) means for moving said sheets of material along said path of travel, b) an alignment means for aligning a sheet of material with respect to a reference point located in said path of travel, c) lifting and conveying means positioned below said path of travel of said sheets on said means for moving, and selectively operable to rise above said path of travel and engage and lift said sheets off of said means for moving and move said sheets laterally of said path of travel into engagement with said alignment means, d) means for operating said means for moving until at least one of said sheets of material is in a position of registry with said alignment means, e) means for operating said lifting and conveying means to engage and lift said sheet off of said means for moving and move it laterally into engagement with said alignment means, f) means for stopping said lifting and conveying means when said sheet engages said alignment means, g) means for moving said alignment means, and thereby said sheet of material, into a pre-alignment position while the sheet is still on said means to lift and engage, h) means to move said alignment means out of engagement with said sheet, i) means to lower said lifting and conveying means to a position below said path of travel to redeposit said sheet of material on said means for moving, j) means to move said alignment means, into reengagement with said sheet to place said sheet into a final alignment position, and k) means for moving said alignment means out of engagement with said sheet, freeing said sheet to resume movement along said path of travel.

6. An apparatus aligning sheets of material moving along a path of travel with respect to a reference point, said apparatus including:

a) movable alignment means for positioning a sheet of material with respect to a reference point, b) a brush conveyor means positioned below said path of travel and selectively operable to rise above the path of travel and engage and lift said sheets above said path of travel and move said sheets laterally of said path of travel into engagement with said alignment means, and c) control means connected to said moveable alignment means and said brush conveyor means.

7. An apparatus aligning sheets of material moving along a path of travel with respect to a reference point, said apparatus including:

a) movable alignment means having a pusher plate positioned in a plane in which said sheets of material are to be aligned, said pusher plate movable between at least a pre-alignment and a final alignment position with respect to said reference point, b) a brush conveyor positioned below said path of travel and selectively operable to rise above the path of travel and engage and lift said sheets above said path of travel and move said sheets laterally of said path of travel into engagement with said pusher plate, and c) control means connected to said alignment means and said brush conveyor.

8. An apparatus aligning sheets of glass moving along a path of travel on a production line with respect to a reference line located in the path of travel, said apparatus including:

a) a conveyor means for moving said sheets of glass along said path of travel, b) a movable alignment means for aligning a sheet of glass with respect to said reference line, said alignment means movable between at least a pre-alignment and a final alignment position with respect to said reference line, c) a brush conveyor positioned below said path of travel and selectively operable to rise above said path of travel and engage and lift said sheets of glass above said path of travel and move said sheets laterally of said path of travel into engagement with said moveable alignment means, d) sensor means to determine when at least one of said sheets of glass is in a position of registry with said alignment means, and e) means to control connected to said moveable alignment means, said brush conveyor, and said sensor means.

9. The apparatus defined in claim 8, wherein said moveable alignment means include a glass pusher plate positioned in a plane in which said sheets of glass are to be aligned.

10. The apparatus defined in claim 9, and further including a nylon block adjustably mounted at each end of said glass pusher plate for contacting a sheet of glass.

11. The apparatus defined in claim 10, and further including:

a) a pair of slide block assemblies, and b) a pair of mounting angles, each one of said pair of mounting angles connected to one of said pair of slide block assemblies.

12. The apparatus defined in claim 11, wherein each end of said glass pusher plate is rotatably mounted to one of said pair of mounting angles.

13. The apparatus defined in claim 12, wherein each of said pair of slide block assemblies includes:

a) a threaded bearing block, b) a threaded drive shaft engaging said threaded bearing block, c) an alignment motor driving said drive shaft, and d) an encoder connected to said motor.

14. The apparatus defined in claim 13, wherein said brush conveyor includes:

a) at least one pair of powered conveyor rollers, and b) at least one conveyor run interspersed between said pair of powered conveyor rollers.

15. The apparatus defined in claim 14, wherein each conveyor run includes:

a) a reciprocating base member, b) a pair of pedestals fixedly mounted to said reciprocating base, c) a pair of conveyor sprockets rotatably mounted to said pedestals, and d) a conveyor chain mounted to said sprockets.

16. The apparatus defined in claim 15, wherein said chain is made up of a plurality of links and, at least some of some chain links have brushes mounted thereto.

17. The apparatus defined in claim 15, and further including:

a) a common driveshaft, wherein at least one sprocket of each conveyor run is connected to said common drive shaft, b) a gear box, said common drive shaft connected to said gear box, and c) a brush motor, said gear box connected for rotation to said brush motor.

18. The apparatus defined in claim 17, wherein said sensor means include sensors to determine when a sheet of glass is in a position of registry with said alignment means.

19. The apparatus defined in claim 18, wherein said sensors include a glass in sensor and a glass out sensor.

20. The apparatus defined in claim 19, wherein said control means is connected to said brush motor, said alignment motors, and to said sensors.

21. The apparatus defined in claim 20, and further including:

a) a programmable logic controller, and b) a remote interface electrically connected to said programmable logic controller.

22. The apparatus defined in claim 21, and including:

a) an AC motor drive electrically connected to said programmable logic controller and said brush motor.

23. The apparatus defined in claim 22, and including:

a) a first motion controller electrically connected to said programmable logic controller, b) a second motion controller electrically connected to said programmable logic controller, and c) a third motion controller electrically connected to said programmable logic controller.

24. The apparatus defined in claim 23, and further including a pair of limit switches electrically connected to said first motion controller.

25. The apparatus defined in claim 24, and further including:

a) a first motor drive electrically connected to said second motion controller, and b) a first alignment motor electrically connected to said first motor drive.

26. The apparatus defined in claim 25, and further including:

a) a second motor drive electrically connected to said third motion controller, and b) a second alignment motor electrically connected to said second motor drive.

27. The apparatus defined in claim 26, and further including:

a) a first end of travel limit switch electrically connected to said third motion controller, b) a home limit switch electrically connected to said third motion controller, and c) a second end of travel limit switch electrically connected to said third motion controller.

28. The apparatus defined in claim 27, and including:

a) a further first end of travel limit switch electrically connected to said third motion controller, b) a further home limit switch electrically connected to said third motion controller, and c) a further second end of travel limit switch electrically connected to said motion controller.

29. The apparatus defined in claim 28, and further including:

a) a glass in limit switch electrically connected to said third motion controller, and b) a glass out limit switch electrically connected to said third motion controller.

* * * * *